United States Patent [19]
Hoffman et al.

[11] Patent Number: 5,597,282
[45] Date of Patent: Jan. 28, 1997

[54] METHOD AND APPARATUS FOR UNSTACKING AND UNLOADING A STACKED LOAD FROM ONE LEVEL TO ANOTHER LEVEL

[75] Inventors: Bradley P. Hoffman, Loveland; Douglas H. Kent, Mariemont; William C. Hall, West Chester, all of Ohio

[73] Assignee: Leyman Manufacturing Corporation, Cincinnati, Ohio

[21] Appl. No.: 521,033

[22] Filed: Aug. 29, 1995

[51] Int. Cl.[6] .................................................. B60P 1/44
[52] U.S. Cl. ......................... 414/545; 414/341; 414/540; 414/786; 414/797.5
[58] Field of Search ................................. 414/340, 341, 414/343, 347, 522, 540, 544, 545, 793.4, 786, 797.5

[56] References Cited

U.S. PATENT DOCUMENTS

| | | | |
|---|---|---|---|
| 1,603,387 | 10/1926 | Heise | 414/545 |
| 2,512,798 | 6/1950 | Hodges | 414/341 |
| 3,589,537 | 6/1971 | Petersen | 414/545 |
| 5,112,183 | 5/1992 | Nusbaum et al. | 414/544 |
| 5,411,363 | 5/1995 | Ishii | 414/797.5 |

FOREIGN PATENT DOCUMENTS

| | | | |
|---|---|---|---|
| 2583697 | 12/1986 | France | 414/545 |

*Primary Examiner*—Thomas J. Brahan
*Attorney, Agent, or Firm*—Wood, Herron & Evans, P.L.L.

[57] ABSTRACT

An extensible arm is located in the bed of a truck or a trailer and is selectively operable to assist in the stacking or unstacking and unloading of a stacked palletized load from the elevated bed to the ground level using a load lift on the truck or trailer and a pallet jack. The stacked load is moved from the bed onto the load lift with a pallet jack or other load transporter, and the load lift is lowered to a position where the extensible arm can be extended below the pallet of an upper load portion of the stacked load. After the arm is extended, the load lift is lowered to the ground leaving the upper load portion on the extended arm and moving the lower load portion of the stacked load to the ground, thereby unstacking the load. Thereafter, the lift is raised to engage the upper load portion, the arm is retracted, and the lift is lowered to lower the upper load portion to the ground.

15 Claims, 5 Drawing Sheets

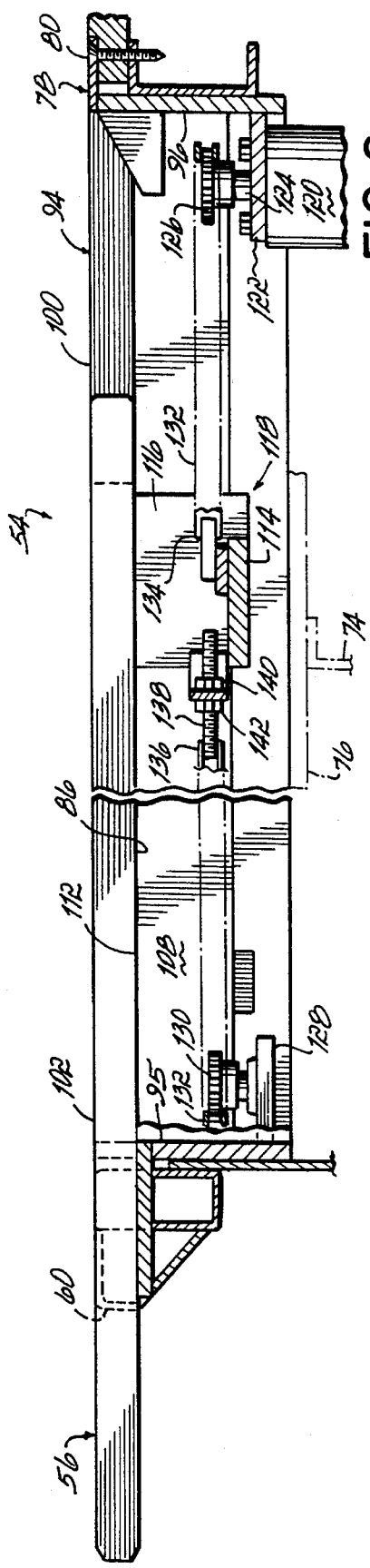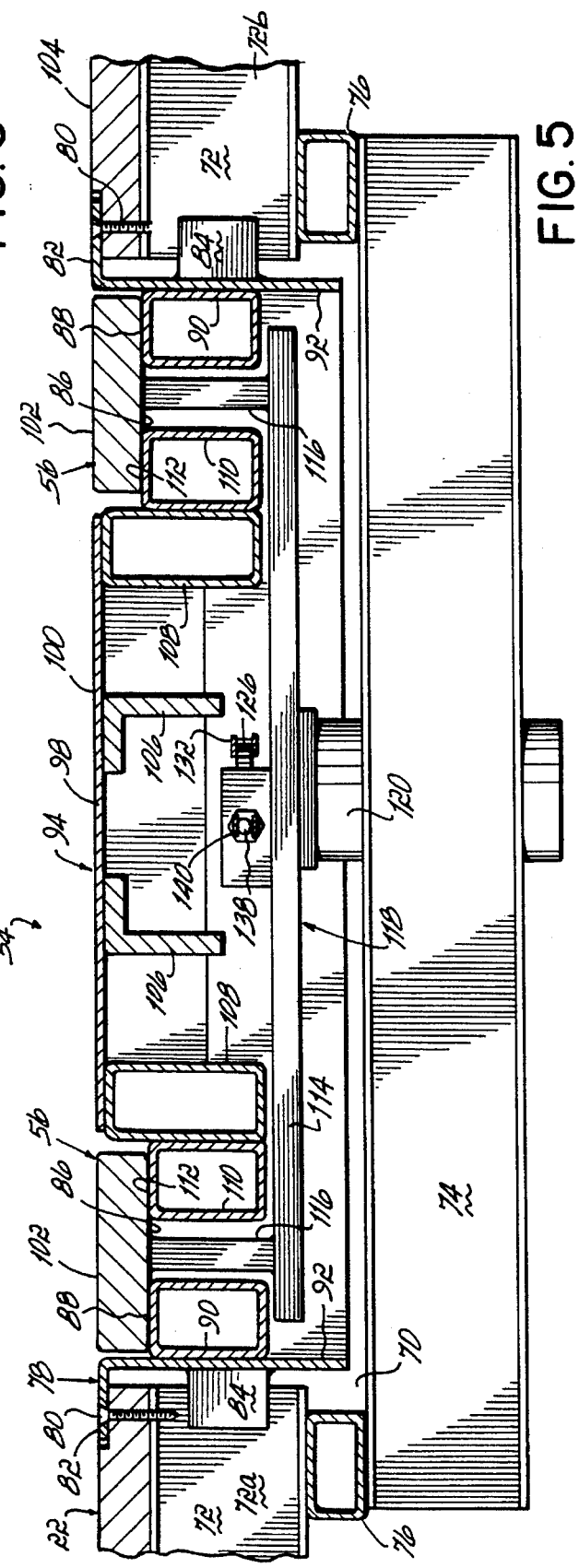

METHOD AND APPARATUS FOR UNSTACKING AND UNLOADING A STACKED LOAD FROM ONE LEVEL TO ANOTHER LEVEL

FIELD OF THE INVENTION

This invention relates generally to the unloading of freight or cargo from a vehicle, and more particularly, provides a method and apparatus for separating and unloading stacked loads typically carried in a vehicle.

BACKGROUND OF THE INVENTION

In one form of material handling, cargo or freight on a vehicle is moved from the vehicle to a shipping dock which has the same elevation as the floor or bed of the truck or trailer carrying the freight. After the truck or trailer backs up to the shipping dock, a forklift or manual pallet jack is used to move the load from the truck or trailer onto the shipping dock. Thereafter, if the cargo is stacked, it may be unstacked with the fork lift vehicle or other equipment and then moved to a desired location.

Such operations are more difficult where there is no shipping dock; and the stacked load must be lowered from the truck or trailer floor or bed to a location on the ground, for example, a pavement or a floor of a building. Often, the truck or trailer is provided with a load lift, for example, a hydraulic or electrically powered, or a manually operated, elevator platform which is movable between the height of the truck or trailer bed or floor and the ground level. Stacked loads most often are palletized, that is, each load is mounted on a pallet having a supporting surface held above the ground by skids. The skids provide a clearance so that elevating or lift arms can be maneuvered under the supporting surface to raise and move the pallet and its load. A hand operated pallet jack or forklift truck is maneuvered beneath the lowermost pallet and load within the stack. The whole stack is then lifted, moved to the load lift at the rear of the truck or trailer and lowered to a receiving surface, for example, the floor or ground level. Thereafter, the stacked load is removed from the load lift and is unstacked. If the individual loads within the stacked load are sufficiently light, they may be moved manually. If they are heavy or bulky, they must be unstacked using a forklift or other elevating equipment.

The unstacking of the load is significantly more difficult, if not impossible, if such equipment is not available. For example, in many situations, only a pallet jack is available. A pallet jack is only capable of lifting or jacking a palletized load six inches or so off of the ground, after which the pallet jack wheels permit the load may be maneuvered or rolled around. Therefore, a pallet jack is not designed to nor is it capable of unstacking a stacked load. Consequently, even though there are efficiencies in shipping stacked loads, stacked loads present handling problems both, in creating the stacked load, and, in unstacking the stacked load. More specifically, creating a stacked load and unstacking a stacked load is virtually impossible when only a pallet jack is available. Therefore, there is a need to improve the capability of stacking and unstacking loads, especially in situations where forklift trucks, cranes and other elevating equipment is not available.

Accordingly, an object of the present invention is to provide an improved method and apparatus for unstacking and unloading a stacked load from a truck or trailer more efficiently and economically.

SUMMARY OF THE INVENTION

In accordance with the principles of the present invention, the bed of a truck or trailer is provided with an extensible arm that can be selectively extended outwardly from a rear edge of the bed, and thereafter, retracted back into the bed. The extensible arm is preferably used with a load lift operatively associated with the rear edge of the bed to unstack and unload a stacked load therefrom. In executing that process, the stacked load is moved from the bed onto the load lift with a pallet jack or other load transporter, and the load lift is lowered to a position where the extensible arm can be extended below the pallet of an upper load of the stacked load. After the arm is extended, the load lift is further lowered to the ground, leaving the upper load on the extended arm and moving the pallet jack with the lower load to the ground, thereby unstacking the stacked load. The pallet jack and lower load are moved off of the load lift to distribute the lower load to a desired location. Thereafter, the load lift is raised to a position where it just lifts the upper load off of the extensible arm. The extensible arm is retracted, and the load lift is lowered to lower the upper load of the stacked load to the ground level. The pallet jack or other transporter then picks up the upper load to move it to a desired location. Accordingly, where the stacked load comprises two loads, one stacked on top of the other, the extensible arm is used with the load lift to facilitate handling separately each of the loads in the stack, so that they may be unstacked and unloaded from the truck bed. The extensible arm of the invention has the advantage of permitting a single operator using only a manual pallet jack or fork lift to unload and unstack heavy and bulky stacked loads from an elevated truck bed to the ground.

In another aspect of the invention, an improved method of installing an extensible arm for unstacking in a vehicle such as a truck or a trailer bed, includes the cutting out of the central portion of the bed and the cross support members of the trailer or truck, adding additional cross ties underneath those elongated supporting frames, and disposing the extensible fork mechanism in the cut out area between the cut ends of the original cross member supports. The invention has the advantage of unobtrusively being installed flush in the bed of truck and is operable with known load lift or truck gate elevating devices to provide the capability of stacking and unstacking loads with only a pallet jack to move the load.

These and other objectives and advantages will become readily apparent from the following detailed description of a preferred embodiment of the invention, and from the drawings in which:

BRIEF DESCRIPTION OF THE DRAWINGS

FIG. 5 is a cross-sectional end view taken along the line 5—5 of FIG. 4 illustrating the extensible fork mounted in the trailer bed in accordance with the principles of the present invention; and FIG. 6 is a cross sectional side view of the extensible fork mounted within the trailer bed taken along line 6—6 of FIG. 4.

DETAILED DESCRIPTION OF THE INVENTION

Figure 1:
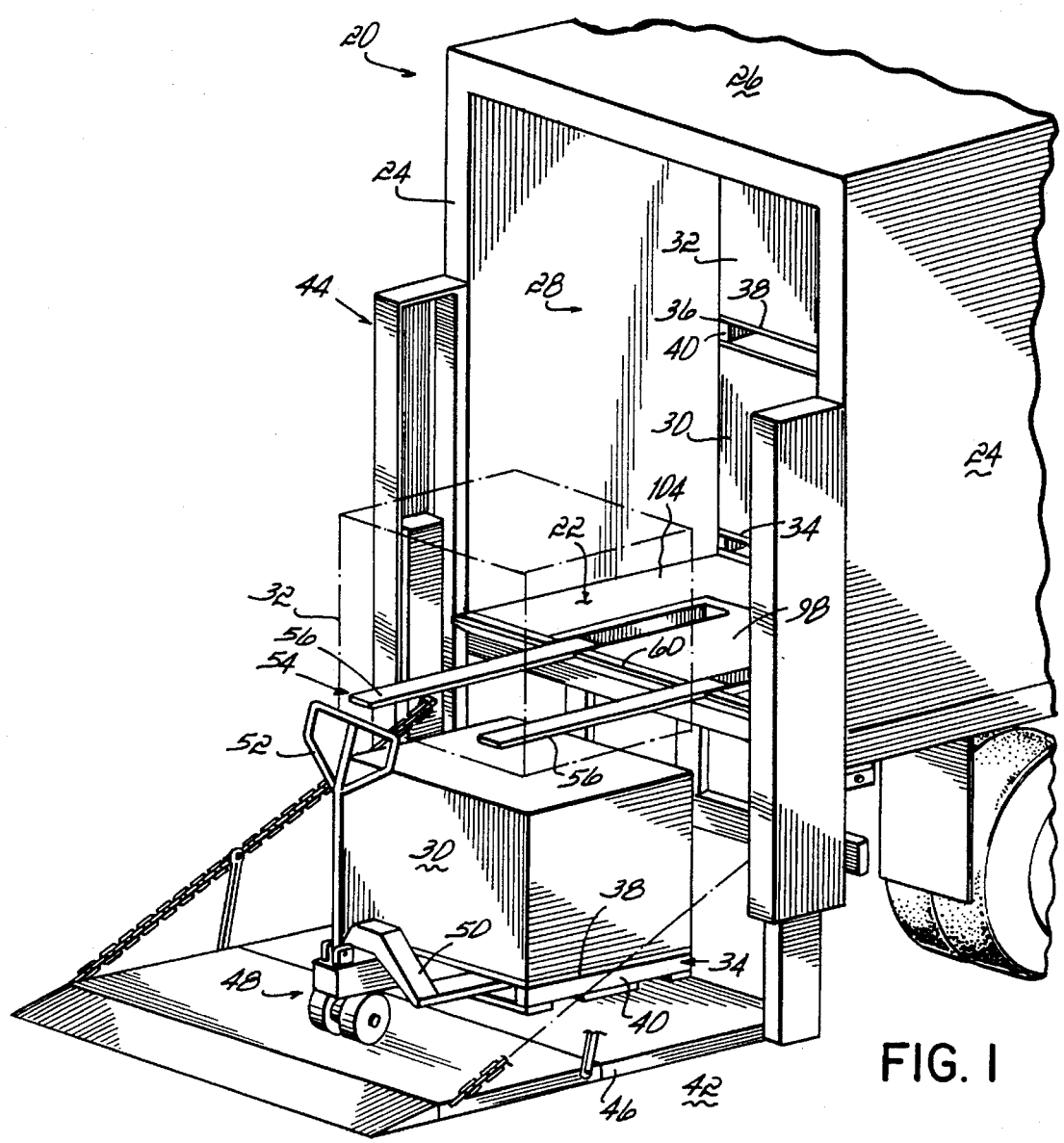
FIG. 1 is a partial perspective view illustrating unstacking and unloading a stacked load in accordance with the principles of the present invention.

Referring to FIG. 1, a vehicle 20 such as a truck or trailer has a floor or bed 22 that is surrounded by sidewalls 24 and a top 26. The bed 22 is often made of wood and has a planar flat surface for supporting cargo 28. The cargo 28 in the vehicle is stacked and palletized, and each stack includes a lower load or load portion 30 supporting an upper load or load portion 32 that is stacked on top of the lower load 30. Of course, it will be appreciated that stacked loads of multiple portions in excess of two can be handled by the invention. The lower and upper loads 30, 32 are mounted on pallets 34, 36 respectively. Each of the pallets 34, 36 has a load bearing top 38 which is laterally supported on each side by skids or frame members 40. In situations where the cargo 28 is to be unloaded onto a shipping dock, a forklift truck or other vehicle having vertically movable support arms is used to either unload the stacked loads 30, 32 or, alternately, unstack the load by first unloading the upper load 32 and thereafter, unloading the lower load 30.

There are many places where the vehicle 20 must be unloaded in the absence of a shipping dock; and therefore, the stacked loads 30, 32 must not only be unloaded but also must be moved from the elevated position of the bed 22 to the lower, floor or ground level 42. To accommodate those situations, many vehicles 20 have a load lift 44 which includes an elevatable load supporting platform 46. The platform 46 is moved between the higher level of the bed 22 and the lower level 42 under the control of an operator by well known power mechanisms and drives (not shown).

There are also many situations where a forklift-type of truck is not available and the stacked cargo 28 must be unloaded from the vehicle 20 using a hand-operated pallet jack 48. The pallet jack 48 has a jack fork 50 which, as shown with respect to the lower load 30 on the platform 46, can be moved into the pallet 34 of the lower load 30. The pallet jack 48 is then operated to raise the jack fork 50 approximately six inches to lift the lower load 30 and the upper load 32, shown in phantom, from the platform 46 or other supporting surface. Thereafter, the handle of the pallet jack 52 is pulled or pushed to move the pallet jack and its load to a different location. The pallet jack 48 may be unpowered or may have a motor drive depending on its size and weight carrying capability.

Since the pallet jack fork 50 can be elevated only through a small displacement, the problem remains of how to remove or unstack the upper load 32 from the lower loads 30. In many cases, the weight of the upper load 32 makes it prohibitive to manually unstack it from the lower load 30. To resolve that problem, the present invention provides an unstacking apparatus 54 preferably including two extensible arms 56. As shown in FIG. 1, the load lift 44 is moved to a position to permit the arms 56 to be extended that is, linearly translated outwardly from the rear edge 60 of the bed 22 beneath the top of the pallet, shown in phantom, for the upper load 32 (also shown in phantom). As the load lift 44 is lowered to the ground 42, the extensible arms 56 support the upper load 32. The lower load 30 remains on the pallet jack 48. After the lower load 30 is distributed to its desired location, the load lift 44 is then raised to pick up the upper load 32 from the extensible arms 56. The arms 56 are retracted, that is, linearly translated inwardly past the rear edge 60; and the load lift lowers the upper load to the ground 42. The pallet jack 48 is used to pick up the upper load 32 from the load lift 44 for distribution.

Figure 2A:
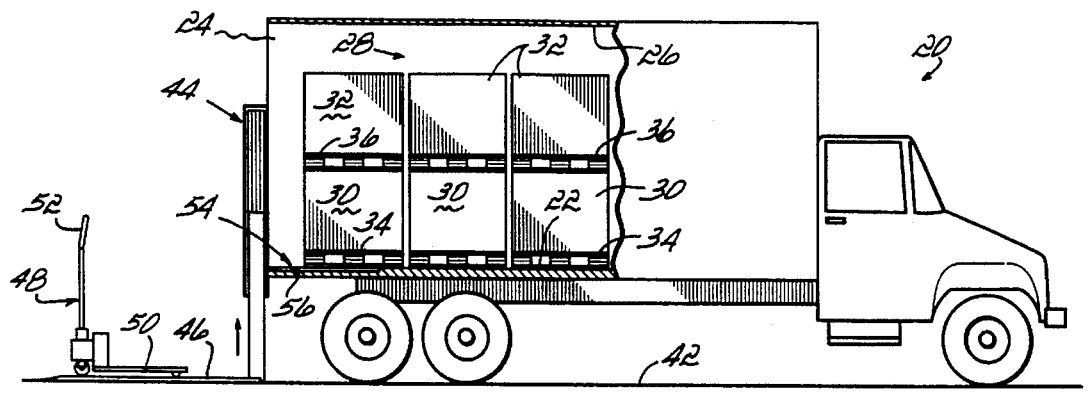
FIGS. 2A–2G are a series of schematic illustrations of how the apparatus of the present invention is used to unstack and unload a stacked load from a vehicle.

FIGS. 2A through 2G illustrate how the unstacking device can be used to unstack and unload a stacked and palletized cargo 38 from the vehicle 20. Referring to FIG. 2A, the cargo 28 is illustrated as a plurality of stacks of lower loads 30 setting on pallets 34. A plurality of upper loads 32 rest on their respective pallets 36, on top of the lower loads or portions 30. To begin the unloading process the hand-operated pallet jack 48 is maneuvered onto the support platform 46 of the load lift 44. At this time, the extensible arms 56 of the unstacking device 54 are in their retracted position within the bed 22. After the pallet jack 48 is positioned on the support platform 46, the load lift 44 raises the platform 46 to an upper position where it is adjacent to the rear edge 60 and generally co-planer with the bed 22. The pallet jack 48 is then maneuvered onto the bed 22 and its jack fork 50 is inserted beneath the top 38 of the pallet 34 of the lower load 30. The jack fork 50 is then raised to lift the entire load comprising lower load 30 and the stacked upper load 32 off of the bed 22.

Figure 2B:
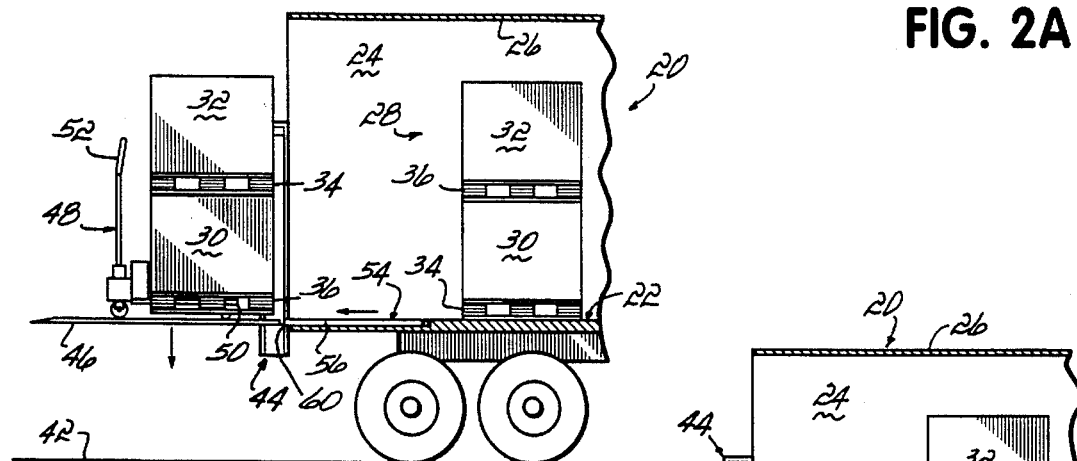

Referring to FIG. 2B, the pallet jack 48 is then maneuvered back to a position on the supporting platform 46 of the load lift 44. To facilitate the desired alignment of the stacked loads 30, 32 shown in phantom in FIG. 3, on the load lift platform 46, lines 57, 58 are striped on the support platform 46. Therefore, the pallet jack 48 is maneuvered to align the front of the loads 30, 32 with the line 57 and the sides of the loads 30, 32 within the parallel lines 58. Other locating means such as jack guides or other visual indicia of any type could be used.

Figure 2C:
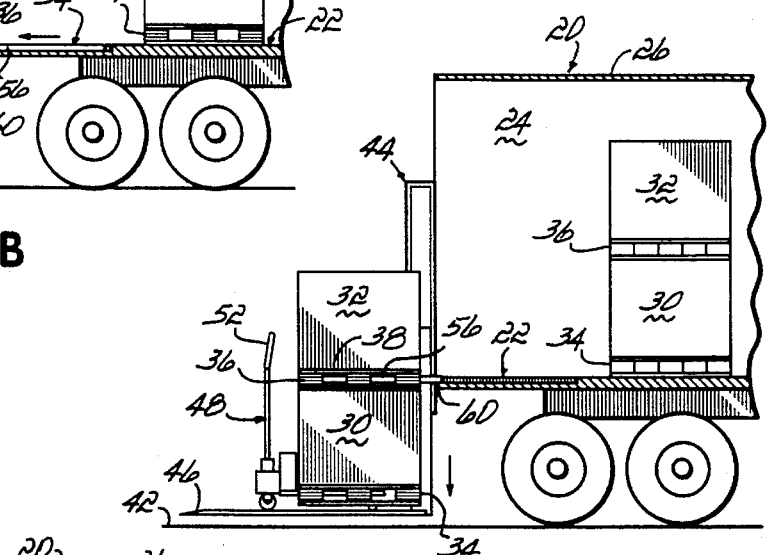
Figure 2D:
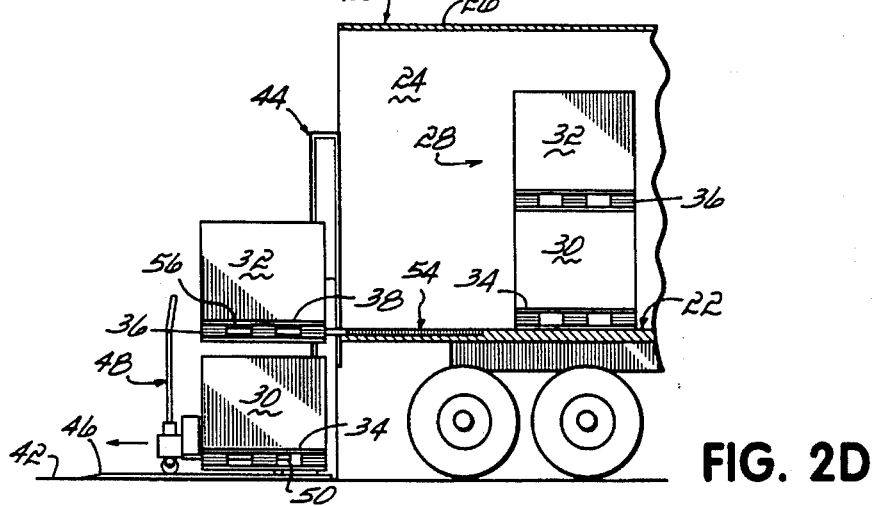
Figure 2E:
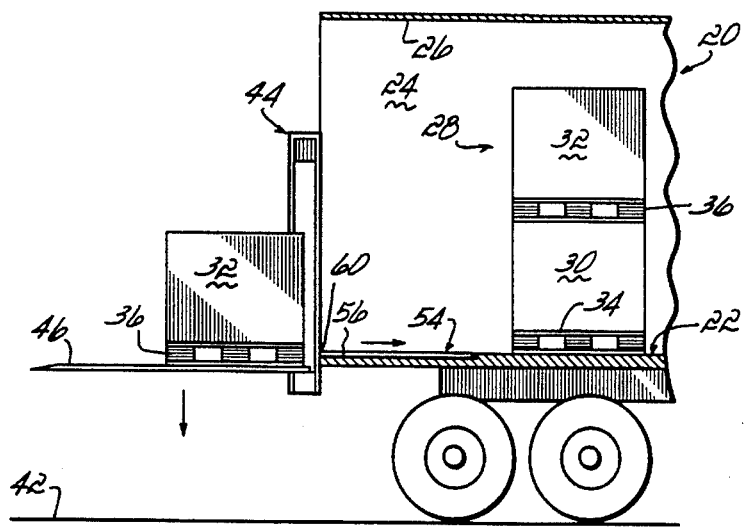

The load lift 44 is operated to lower the platform 46 to an intermediate position between its upper position illustrated in FIG. 2B and the ground level 42. The intermediate position illustrated in FIG. 2C is a position that permits the extensible arms 56 of the unstacking device 54 to be extended outwardly from the rear edge 60 of the bed 22 to a position below the top 38 of the pallet 36 supporting the upper load 32. Thereafter, the load lift 44 is operated so that the supporting platform 46 moves down to and rests on the ground or floor level 42 as illustrated in FIG. 2D. When in that position, the upper load 32 and its pallet 36 are resting on and supported by the extensible arms 56 of the unstacking device 54, thereby unstacking the upper load 32 from the lower load 30.

Figure 2F:
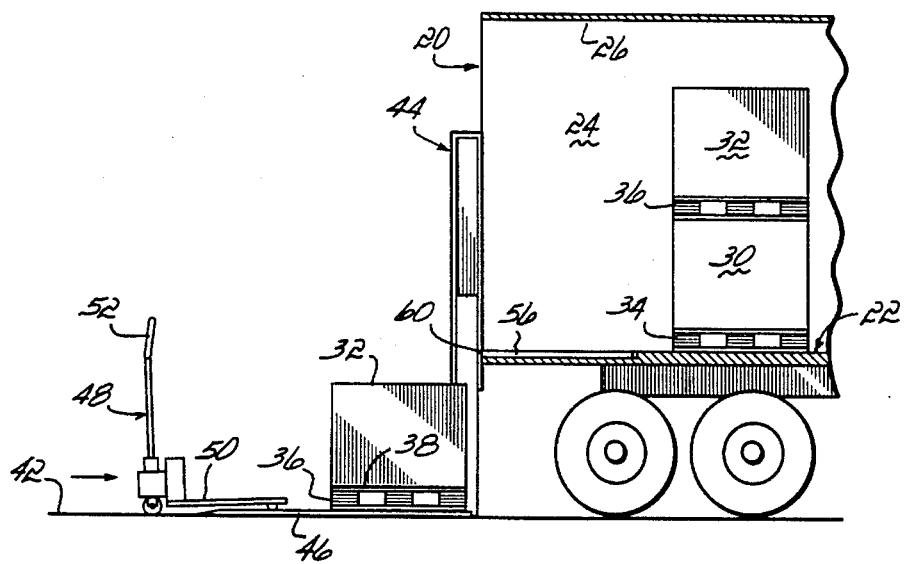
Figure 2G:
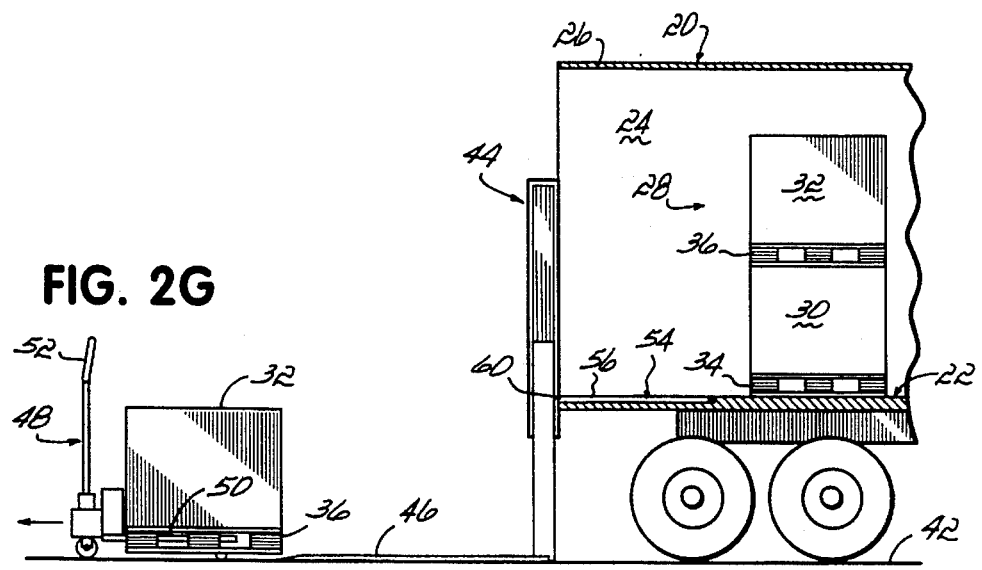

After the loads are unstacked, the pallet jack 48 is used to distribute the lower load 30 and its pallet 34 to its desired location. After the pallet jack 48 and the lower load 30 have been maneuvered off of the support platform 46, the load lift 44 is operated to raise the support platform 46 to a second intermediate position illustrated in FIG. 2E. When in that position, the support platform 46 has raised the upper load 32 and its pallet 36 off of the extensible arms 56 of the unstacking device 54. With the upper load 32 removed from the extensible arms, they may then be retracted back to their original position within the bed 22. In that position, the extensible arms 56 do not protrude from the rear edge 60 of the bed 22. After the extensible arms 56 have been retracted, the load lift 44 is operated to lower the support platform 46 back down onto the ground 42 as shown in FIG. 2F. The pallet jack 48 is then maneuvered onto the support platform 46, and the jack fork 50 is positioned under the top 38 of the pallet 36 and then elevated to lift the upper load 32 and its pallet 36 off of the support platform 46. Thereafter, as illustrated in FIG. 2G, the pallet jack 48 is maneuvered to distribute the upper load 32 to its desired location. The process just described with respect to FIGS. 2A–2G is repeated for the other stacked loads 30, 32 which remain on the bed 22 of the vehicle 20.

As is appreciated, although the example described and illustrated relates to two stacked loads, the stacking device of the present invention and the above-described process may be repeated at any number of times to unstack any number of loads or portions that are stacked one on top of the other within the vehicle 20.

Figure 4:
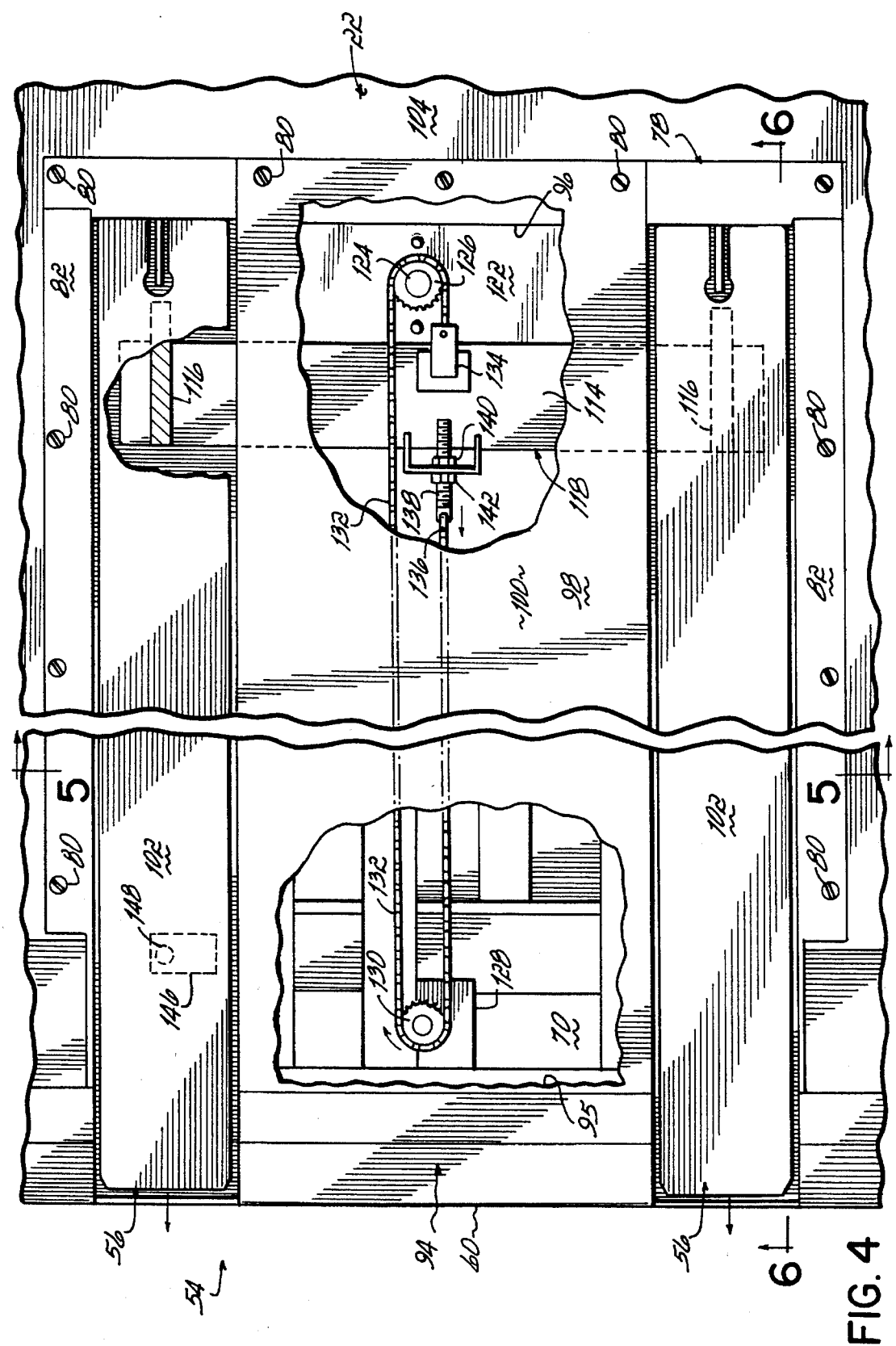
FIG. 4 is a top plan cut away view of an extensible fork mounted in a trailer bed in accordance with the principles of the present invention, and has a similar orientation as FIG. 3.

FIGS. 4–6 illustrate the detailed structure of the unstacking device 54 and its installation within the bed 22 of a vehicle 20. The cargo hauling portions of trucks and trailers have two general types of constructions. With one type of construction, a plurality of I-beams or channels extend longitudinally from the front to the back of the cargo area; and a series of I-beams or channels stretch transversely across those girders. The bed side walls 24 (FIG. 1) and top 26 of the cargo hauling portion of the truck or trailer 20 is then constructed on top of the transverse I-beams or channels. In an alternate construction, the longitudinal girders are not used; and instead, the trailer is constructed on a plurality of I-beams or channels functioning as cross ties that extend from side to side. The unstacking device of the present invention can be installed in beds of either construction, as well as other constructions which are not generally known to applicants.

Referring to FIGS. 4–6, installation of the unstacking device 54 requires that the generally flat bed 22 of the vehicle 20 have a generally U-shaped channel 70 manufactured therein. The U-shaped channel 70 is created by first cutting a hole in the bed 22, of a sufficient size to accept the structure of the unstacking device 54. Next, any beams or other cross ties 72 that extend across the opening in the bed 22 are cut to provide two cross ties 72a, 72b that are separated by a space generally equal to the size of the opening cut into the bed 22. Thereafter, the cut ends of the cross ties 72a, 72b must be rigidly connected together so that they provide the necessary support. Preferably, the ends of the cross ties 72a, 72b are tied together with a cross beam 74. To provide the necessary depth for the U-channel 70, spacer channel members 76 are interposed between the lower surfaces of the cut cross ties 72a, 72b and the top of the cross beam 74. The structure comprising the ends of cross ties 72a, 72b, cross beam 74 and spacer channel members 76 are rigidly welded together so that the unitary structure provides the desired support.

The supporting structure or frame 78 of the unstacking device 54 is placed within the channel 70 and is secured in place by screws, nuts and bolts, or other fasteners 80 that extend through a mounting flange 82 and the bed 22 and preferably, are threaded into the upper flange the beam 72. For additional strength, blocks 84 are welded between the outer sides of the frame 78 and the cross ties 72a, 72b. The lower surfaces 86 of the arms 56 bear against and slide across upper surfaces 88 of channel members 90 which are welded to the sides 92 of the supporting structure 78. The unstacking device 54 has a centrally located longitudinally extending center structure 94 that, as shown in FIG. 6, extends between the ends 95, 96 of the supporting structure 78. As shown in FIG. 5, the center structure has an upper plate 98 that has an upper surface 100 that is generally co-planar with the upper surfaces 102 of the arms 56. The unstacking device 54 is mounted to the bed 22 so that the surfaces 100, 102 are also generally co-planar with the upper surface 104 of the bed 22. The center structure 94 further includes angle brackets 106 that are welded to the bottom of the upper plate 98 and extend longitudinally between the ends 95, 96 of the support structure 78. In addition, channel members 108 are welded to the lower side of the upper plate 98 and extend longitudinally along the lateral side edges of the upper plate 98. Other channel members 110 are welded to the sides of the channel members 108 such that their upper surfaces 112 are generally co-planar with the upper surfaces 88 of the channel members 90. Therefore, the upper surfaces 88, 112 of the respective channel members 90, 110 provide a bearing surface for the lower surfaces 86 of the arms 56 as the arms are extended outwardly from and retracted inwardly within the bed 22. The sliding arms 56 are tied together by a cross plate 114 that extends transversely across the bed 22. The ends of the cross plate 114 are welded to the lower sides of vertically extending beams 116. The upper sides of the beams 116 are welded to the lower surfaces 86 of the arms 56. Therefore, the arms 56, beams 116 and cross plate 114 form a unitary U-shaped or fork-shaped extensible member 118.

Referring to FIG. 6, the reciprocation of the extensible fork 118 outwardly from and inwardly toward the bed 22 is powered by a motor 120 that is connected to the end wall 96 of the support structure 78 by a motor mounting bracket 122. The output shaft 124 of the motor 120 has a drive sprocket 126 mounted thereon. The outer end wall 96 of the support structure 78 has a bracket 128 on which an idler sprocket 130 is rotatably mounted. A chain 132 is connected at one end 134 to the cross plate 114. The chain loops around the sprocket 126, extends to and loops around the sprocket 130 and is connected at its other end 136 to the cross plate 114. The end 136 of the chain 132 is connected to a threaded shaft 138 which extends through a nut 140 to stretch the chain 132 to a predetermined tension force. A lock nut 142 is then tightened to prevent any inadvertent change in the tensioning force. Therefore, when it is desired to operate the extensible fork 118, the motor 120 is energized, thereby rotating sprocket 126, and moving the cross plate 114 and extensible fork to the left or to the right as viewed in FIG. 6, depending upon the direction of rotation of the motor 120.

Referring to FIG. 4, a sensor mounting bracket 146 is welded to the outside of one of the channels 110. A sensor 148 is mounted in the bracket 146 such that the top of the sensor is immediately below the lower surface 86 of one of the arms 56. The sensor 148 operates as a proximity sensor and detects the immediate proximity of the lower surface 86 of the one of the arms 56. In the event that the arms 56 are in their extended position and the load lift 44 is operated to move the support platform upward such that it engages the arms 56, the lower surfaces 86 of the arms 56 will be lifted away from the proximity sensor 148, thereby causing the sensor to produce an output signal. The output signal from the sensor 148 can be used in a well known manner to interrupt the operation of the load lift 44, thereby preventing damage. As will be appreciated, the sensor 148 can be mounted in association with either one of the arms 58.

The motor 120 may be a hydraulic motor or an electric motor. In either case, the power being supplied to the motor as measured by the pressure drop across the hydraulic motor or the current being supplied to an electric motor can be measured utilizing well known pressure gauges or current meters, respectively. In the even that the arms 56 or any other component of the extensible fork 118 encounters an obstruction, the motor 120 will demand a greater input of power in an attempt to move the obstruction. Therefore, a pressure drop or current limit can be set for the motor 120 that exceeds the maximum expected load and is indicative of the extensible fork being bound in its motion by an obstacle or for some other reason. Upon such sensing, the motor is stopped so that the arms do not extend and inadvertently push a load off the lift.

While the invention has been set forth by a description of the preferred embodiment in considerable detail, it is not intended to restrict or in any way limit the claims to such detail. Additional advantages and modifications will readily appear to those who are skilled in the art. For example, while preferably the extensible member 118 is described as a generally U-shaped fork with two extensible arms, as will be appreciated, the extensible member 118 may alternatively be a single extensible arm. The single extensible arm may have a cross member on its end to help support and balance the pallet. Further, various structural members such as channel members 90, 106, 108, 110 are preferably made from steel channel bar stock. However, the channel members may be fabricated from an angle iron or other metal components, from wood, from composite materials, or any other material that is effective to provide the necessary supporting functions. The motor 120 may be a pneumatic or hydraulic cylinder or any other source of linear or rotary mechanical power, and the chain and sprocket drive may be replaced by a sheave drive or other power transfer mechanism. Further, while preferably the extensible fork 118 is extended outwardly from and retracted into the bed 22 using a motor 120, alternatively, the fork may also be manually operated, as desired.

Figure 3:
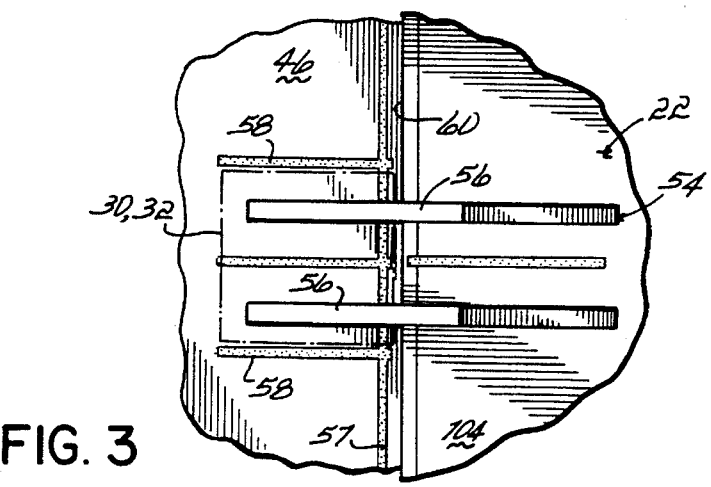
FIG. 3 is a partial top plan view of the load lift platform illustrating apparatus alignment and guide lines as used with the invention.

In the described embodiment, the top surface of the arms 56 and the upper plate 98 are co-planar with the bed 22, variations in the elevations of those surfaces do not hinder the function and operation of the invention. For example, alternatively, the extensible arms 56 may be mounted in the bed 22 so that the upper surface 100 of the upper plate 98 is substantially co-extensive or co-planar with the upper surface 104 of the bed 22. In FIG. 3, indicia for aligning the stacked load with the extensible is shown marked on the platform of the load lift. As will be appreciated, such indicia may be marked on the bed.

In the example described herein, the invention is used to unstack and unload a stacked load from an elevated bed, as will be appreciated, by reversing the process described with regard to FIGS. 2A–2G, the invention may also be used to stack and load cargo into stacked loads on a vehicle. Further, in the preferred method, the load lift is used to lower the upper portion of the stacked load to the ground. Alternatively, the pallet jack may be moved on the load lift platform; and when the platform is raised, the pallet jack will support the upper load as it is lifted off of the extended arms. Thereafter, the pallet jack and upper load may be lowered to the ground.

The invention, therefore, in its broadest aspects, is not limited to the specific detail shown and described. Consequently, departures may be made from the details described herein without departing from the spirit and scope of the claims which follow.

What is claimed:

1. Apparatus for stacking or unstacking a stacked load carried in a vehicle, the vehicle having a bed and a load lift operably disposed adjacent a bed edge for lowering loads from a height of the bed to a ground level, with the load lift supporting the stacked load, the apparatus comprising:

a first extensible arm disposed in the bed and selectively movable in a direction generally parallel with a plane defined by the bed between a first, load-bearing position extended outwardly from the bed edge and beneath a portion of the stacked load supported on the load lift, and a second, nonload-bearing position retracted back into the bed.

2. The apparatus of claim 1 further comprising:

a second extensible arm being movable with the first extensible arm outwardly from the bed edge and beneath the portion of the stacked load supported on the load lift.

3. Apparatus as in claim 2 wherein said arms have upper surfaces substantially coplanar with an upper surface of the bed.

4. Apparatus as in claim 3 wherein the load lift is movable to positions intermediate the height of the bed and the ground level to facilitate motion of said extensible arms beneath the portion of the stacked load.

5. Apparatus for either stacking and loading a stacked load or unloading and unstacking a stacked load between a higher level and a lower level, the apparatus including:

a first surface at the higher level and having an edge;

a load lift having a platform for supporting the stacked load, the platform being disposed adjacent said edge and operable to move between the higher level and the lower level; and an extensible arm disposed in and substantially coplanar with the first surface and being selectively movable in a direction parallel with the first surface and outward from said edge of said first surface to a position beneath a portion of the stacked load on said platform when said load lift is lowered to a position below said first surface.

6. Apparatus as in claim 5 wherein said extensible arm is disposed substantially coplanar with said first surface and is extensible in a plane substantially parallel to said first surface.

7. Apparatus for stacking and loading or unstacking and unloading loads carried on a bed of a vehicle, the stacked loads including at least two palletized loads, one load atop another, said apparatus comprising:

an extensible arm disposed in the bed, said extensible arm being movable in a direction generally parallel to a plane defined by the bed;

a load lift operably disposed adjacent the bed and having a platform for receiving the stacked loads from the bed and for lowering the stacked loads from the bed to a lower level, said load lift platform being movable to an upper position generally parallel with the plane of the bed for receiving the stacked load, an intermediate position permitting said extensible arm to be moved to a position between two loads in the stacked load so that the extensible arm is in a position to support an upper one of the two loads, and a lower position adjacent the lower level, thereby resting the upper one of the two loads on the extensible arm to unstack the stacked load and further, moving the lower one of the two loads to the lower level.

8. The apparatus of claim 7 further including apparatus for limiting motion of said extensible arm in said direction.

9. The apparatus of claim 7 further including drive means operably connected to the extensible arm for extending and retracting said extensible arm.

10. The apparatus of claim 9 further including apparatus for stopping motion of said extensible arm in response to said extensible arm encountering an obstruction while moving in said load supporting direction.

11. Apparatus as in claim 9 further including means for preventing retraction of said extensible arm in response to pressure thereon from a load resting on said extensible arm.

12. The apparatus of claim 7 wherein one of the bed and the platform have indicia thereon for aligning the stacked loads on the platform.

13. A method of unstacking and moving a stacked load of at least two stacked portions from a bed of a vehicle to a lower ground level, the method comprising the steps of:

moving the stacked load past an edge of the bed to a platform of a load lift;

lowering the platform with the stacked load to a position between the bed and ground level at which an extensible arm can be extended to a position between the upper and lower load portions of the stacked load;

extending the extensible arm disposed in the bed in a direction parallel to the bed to a position beneath the upper load portion of the stacked load; and lowering the platform with the stacked load to rest the upper load portion on the extensible arm and to lower the lower load portion toward the ground level, thereby unstacking the stacked load.

14. The method of claim 13 further comprising the steps of:

lowering the platform to a position adjacent the ground level;

removing the lower load portion from the platform;

raising the platform into supporting contact with the upper load portion resting on the extensible arm;

raising the platform to move the upper load portion off of the extensible arm;

retracting the extensible arm to a position clear of the upper load portion; and lowering the platform with upper load portion to a position adjacent the ground level to permit the upper load portion to be removed from the platform.

15. A method of installing an extensible arm for stacking or unstacking a stacked load in a bed of a vehicle having a plurality of cross support members and including the steps of:

cutting an opening in the bed adjacent to and generally centrally located with respect to a rear edge of the bed, and the opening being sized to receive a support structure on which the extensible arm is mounted;

cutting out an intermediate section of each cross support member extending across the opening to produce a pair of cut ends separated by a space coextensive with the opening;

connecting a cross beam between and below each pair of cut ends of each said cross support member;

disposing the support structure of the extensible arm in the opening in the bed and between said cut ends; and connecting the supporting structure to the cut ends of each pair of cross ties, thereby permitting the extensible arm to extend outwardly from and beyond the rear edge of said bed for supporting, when extended, an upper portion of the stacked load partially lowered from said bed.

* * * * *